United States Patent
Gordon et al.

(10) Patent No.: US 10,977,345 B2
(45) Date of Patent: Apr. 13, 2021

(54) AUTHENTICATION SESSION EXTENSION USING EPHEMERAL BEHAVIOR DETECTION

(71) Applicant: TwoSesnse, Inc., New York, NY (US)

(72) Inventors: Dawud Gordon, Brooklyn, NY (US); John Tanios, Brooklyn, NY (US)

(73) Assignee: TwoSesnse, Inc., Brooklyn, NY (US)

( * ) Notice: Subject to any disclaimer, the term of this patent is extended or adjusted under 35 U.S.C. 154(b) by 83 days.

(21) Appl. No.: 15/897,429

(22) Filed: Feb. 15, 2018

(65) Prior Publication Data

US 2018/0239883 A1   Aug. 23, 2018

Related U.S. Application Data

(60) Provisional application No. 62/460,450, filed on Feb. 17, 2017.

(51) Int. Cl.
| | | |
|---|---|---|
| *G06F 21/31* | (2013.01) | |
| *G06F 21/32* | (2013.01) | |
| *G06F 21/44* | (2013.01) | |

(52) U.S. Cl.
CPC ............ *G06F 21/316* (2013.01); *G06F 21/32* (2013.01); *G06F 21/44* (2013.01); *G06F 2221/2137* (2013.01); *G06F 2221/2139* (2013.01)

(58) Field of Classification Search
CPC ........ G06F 21/316; G06F 21/44; G06F 21/32; G06F 2221/2139; G06F 2221/2137; G06F 21/31

(Continued)

(56) References Cited

U.S. PATENT DOCUMENTS

| | | |
|---|---|---|
| 7,636,853 B2 | 12/2009 | Cluts |
| 9,392,460 B1 | 7/2016 | Blake |

(Continued)

FOREIGN PATENT DOCUMENTS

| | | |
|---|---|---|
| EP | 2696605 A1 | 2/2014 |
| WO | 2018048849 | 3/2018 |

OTHER PUBLICATIONS

ISR and Written Opinion of ISA for PCT/US2017/016070 (dated Apr. 25, 2017).

(Continued)

*Primary Examiner* — Quazi Farooqui
(74) *Attorney, Agent, or Firm* — Koffsky Schwalb LLC; Mark I. Koffsky

(57) ABSTRACT

Hardware on a device, including sensors that may be embedded in or accessible to the device, extend the validity session of an authentication event by identifying behavior of the user periodically during the session. By detecting behavior that may be directly or indirectly unrelated to the application—but is necessarily present if the user remains the same—the session is extended for as long as that behavior is within some defined parameters. This process may be accomplished either by using an expert system or through the application of machine learning. Such a system may take input from sensors and detects a pattern in those inputs that coincide with the presence of that ephemeral personal or behavioral patterns that it is desired to detect. Using that detected behavior, the validity of a session can be extended using statements about the variance or invariance of the detected ephemeral personal or behavioral states.

21 Claims, 3 Drawing Sheets

(58) Field of Classification Search
USPC .......................................................... 726/19
See application file for complete search history.

(56) References Cited

U.S. PATENT DOCUMENTS

| | | | |
|---|---|---|---|
| 9,680,812 B1 | 6/2017 | Emaminouri | |
| 9,801,066 B1* | 10/2017 | Hanley | G06Q 20/4012 |
| 9,813,874 B2 | 11/2017 | Gordon | |
| 1,005,722 A1 | 8/2018 | Hess | |
| 2006/0022815 A1 | 2/2006 | Fischer | |
| 2006/0149558 A1* | 7/2006 | Kahn | G10L 15/18 |
| | | | 704/278 |
| 2009/0164120 A1 | 6/2009 | Boore | |
| 2010/0115610 A1 | 5/2010 | Tredoux | |
| 2010/0192209 A1 | 7/2010 | Steeves | |
| 2013/0104203 A1 | 4/2013 | Davis | |
| 2013/0191908 A1 | 7/2013 | Klein | |
| 2013/0322488 A1 | 12/2013 | Yazami | |
| 2013/0324196 A1 | 12/2013 | Wang | |
| 2014/0045537 A1 | 2/2014 | Luther | |
| 2014/0096215 A1 | 4/2014 | Hessler | |
| 2014/0179337 A1 | 6/2014 | Alpert | |
| 2014/0282877 A1 | 9/2014 | Mahaffey | |
| 2014/0282945 A1* | 9/2014 | Smith | H04L 63/0861 |
| | | | 726/6 |
| 2014/0289833 A1 | 9/2014 | Briceno | |
| 2014/0331060 A1 | 11/2014 | Hayton | |
| 2014/0366111 A1 | 12/2014 | Sheller | |
| 2015/0033305 A1 | 1/2015 | Shear | |
| 2015/0257004 A1* | 9/2015 | Shanmugam | H04L 63/0853 |
| | | | 455/411 |
| 2015/0301579 A1 | 10/2015 | Vaccari | |
| 2015/0324563 A1 | 11/2015 | Deutschmann | |
| 2015/0358317 A1 | 12/2015 | Deutschmann | |
| 2016/0042164 A1 | 2/2016 | Goldsmith | |
| 2016/0087957 A1 | 3/2016 | Shah | |
| 2016/0164866 A1 | 6/2016 | Oberheide | |
| 2016/0180078 A1* | 6/2016 | Chhabra | H04W 12/06 |
| | | | 726/19 |
| 2016/0253486 A1 | 9/2016 | Sarkar | |
| 2016/0371454 A1* | 12/2016 | Cho | G16H 50/50 |
| 2017/0161478 A1 | 6/2017 | Stavrou | |
| 2017/0227995 A1 | 8/2017 | Lee | |
| 2018/0307218 A1* | 10/2018 | Lavid Ben Lulu | |
| | | | G06F 16/90335 |
| 2019/0025587 A1 | 1/2019 | Osterhout | |
| 2019/0044942 A1 | 2/2019 | Gordon | |
| 2020/0050745 A1 | 2/2020 | Kim | |

OTHER PUBLICATIONS

PCT International Search Report and Written Opinion for PCT/US18/44722, dated Nov. 30, 2018, 18 pages.
Notice of Allowance dated Apr. 2, 2019 for U.S. Appl. No. 15/796,518 (pp. 1-5).
Extended European Search Report for Application No. EP17748080.3, dated Jul. 19, 2019, 7 pages.
ISR for PCT/US2020/039210 (Sep. 24, 2020) 5 pages.
Bailey et al.; User identification and authentication using multimodal behavioral biometrics; 2014; retrieved from the Internet https:// www.sciencedirect.com/science/article/pii/S0167404814000340; pp. 1-13, as printed. (Year: 2014).
Deng et al.; Keystroke Dynamics Advances for Mobile Devices Using Deep Neural Network; Science Gate Publishing; 2015; Gate to Computer Science and Research, vol. 2. pp. 1-13, as printed. (Year: 2015).
ISR of PCT/US20/056295 (Dec. 10, 2020, 9 pages).
Office Action dated Dec. 9, 2020 for U.S. Appl. No. 16/051,465 (pp. 1-20).

* cited by examiner

AUTHENTICATION SESSION EXTENSION USING EPHEMERAL BEHAVIOR DETECTION

RELATED APPLICATION

This application claims the benefit of the following U.S. Provisional Patent Application, which is incorporated by reference in its entirety:
1) Ser. No. 62/460,450, filed on Feb. 17, 2017.

FIELD OF THE DISCLOSURE

The present disclosure relates generally to a system and method for extending the validity of an authentication session over time on an electronic device using, for example, ephemeral behavior detection.

BACKGROUND

Authenticating the identity of a user is crucial for an application that wishes to ensure access only to the authorized user. Nonetheless, authentication is rarely the purpose of an application. Instead, the process allows the user to execute certain protected functions after authenticating. Under current practice, instantaneous authentication in a session expires after a set period of no activity within the application, at which point the session ends. Current solutions focus on time constraints or device specific metrics. Alternatively, other approaches keep the usage session activated for a period of time after the last user interaction.

Current solutions have many drawbacks. By using temporal or device parameters to extend or end the validity of an authenticated session, these solutions cannot react in instantaneous changes from an authorized to an unauthorized user on the same session. They also end even though an authorized user is still using the device if they do not actively interact with the application.

These current solutions cause at least two problems. First, even immediately after the authentication event, the authentication information may no longer be correct since the user may have changed. Second, the expired authentication sessions may cause unnecessary annoyance and cognitive load to the user when they have to continually reauthenticate.

SUMMARY OF THE INVENTION

The present invention uses the hardware on the device, including sensors that may be embedded in or accessible to the device, to extend the validity session of an authentication event by identifying behavior of the user (either periodically or continuously) during the session. By detecting behavior that may be directly or indirectly unrelated to the application—but is necessarily present if the user remains the same—the session is extended for as long as that behavior is within some defined parameters. This behavior is discerned based on observations from sensors, characteristics aspects of the user, or ephemeral aspects of their behavior. This process may be accomplished either by using an expert system or through the application of machine learning. Such a system may take input from sensors, either hardware (e.g. accelerometer) or software (e.g. the presence of a calendar event), and detects a pattern in those inputs that coincide with the presence of that ephemeral personal or behavioral patterns that it is desired to detect. Using that detected behavior, the validity of a session can be extended using statements about the variance or invariance of the detected ephemeral personal or behavioral states.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
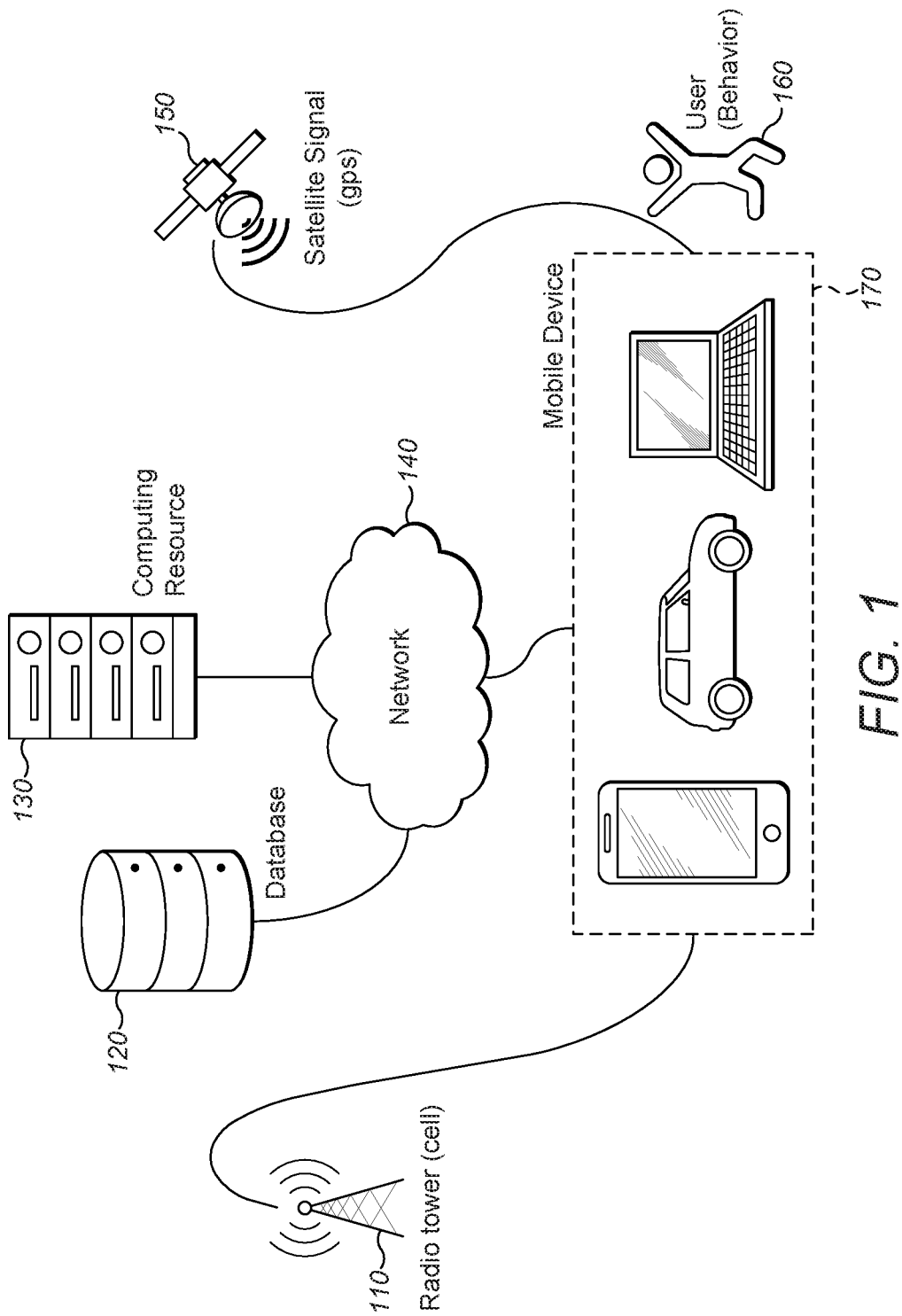
FIG. 1 shows a schematic of a plurality of devices using network computation and storage.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The foregoing descriptions, formulations, diagrams, and figures are provided merely as illustrative examples, and they are not intended to require or imply that the steps of the various embodiments must be performed in the order presented or that the components of the invention be arranged in the same manner as presented. The steps in the foregoing descriptions and illustrations may be performed in any order, and components of the invention may be arranged in other ways. Words such as "then," "next," etc., are not intended to limit the order of the steps or the arrangement of components; these words are used merely to guide the reader through the description of the invention. Although descriptions and illustrations may describe the operations as a sequential process, one or more of the operations can be performed in parallel or concurrently, or one or more components may be arranged in parallel or sequentially. In addition, the order of the operations may be rearranged. In addition, one or more components and one or more steps may be omitted from the apparatus or process.

An example of the present invention may be based on an application on a device that allows the user, for example, to view their bank account balance when opened. Here, the user would start by using a user-name and password as an example authentication mechanism. When a user first logs in the user needs to type in their username and their password to authenticate and view their balance.

An inertial measurement unit (IMU) is an electronic device that measures and reports a body's specific force, angular rate, and sometimes the magnetic field surrounding the body, using a combination of accelerometers and gyroscopes, sometimes also magnetometers. Using the IMU as a motion sensor on the device as well as the capacitive proximity sensor, embodiments of the invention then train and deploy a behavioral extraction model able to detect the difference between the device being on the user's body and being set down. The original authentication session may remain valid for as long as the user keeps the device on their body. In this fashion the number of authentication actions required for multiple interactions is reduced for the time the user maintains the device on their body.

I. Network Resources for Ongoing Authentication

Turning to FIG. 1, shown is a schematic of a plurality of devices using network computation and storage. A device 170 (which may be a phone, tablet, car, laptop, ATM or other device whether mobile or stationary) interfaces with a user 160 based on the user's behavior. The device 170 includes any object that measures a user's behavior or interacts with a user in some way and includes without limitations mobile and stationary objects, wearable objects, mobile objects, cars, trains, buses, plane and other transportation devices, and immobile objects. "Behavior" includes without limitation: (1) imaging of the user (including monitoring and evaluation of facial expressions); and (2) audio recording of person, including listening.

The device 170 may interface with a radio tower 110 for cellular signals and/or with a satellite signal 150 for GPS signals. The device 170 may interface with a network 140, which may be in the cloud. The network 140 may interface with databases 120 and computing resources 130, which may be in the cloud.

The above components relate to each other via data connectivity. Components may be on the device itself using local computation and storage, using local hardware to enable connectivity between modules.

II. Components and Processes for Ongoing Authentication

Figure 2:
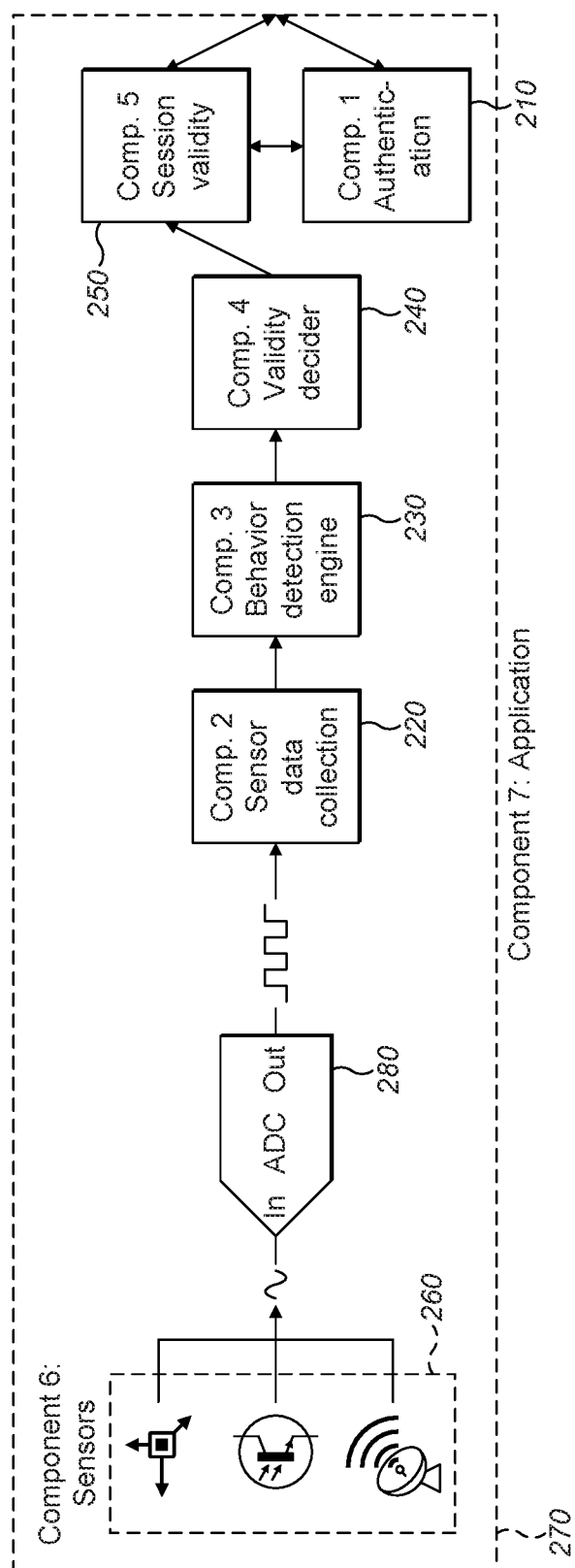
FIG. 2 shows a schematic of a plurality of components, one or more of which may be used to accomplish ongoing authentication

Turning to FIG. 2, shown is a schematic of a plurality of components, one or more of which may be used to accomplish ongoing authentication. The function and operation of these components shown in FIG. 2 follows.

Component 7 270 is the application that encompasses all other components. This application enables a user to accomplish a task. The application is a piece of software or hardware that enables the user to accomplish a task. It may handle the authentication itself, and passes the initial state to Component 5 250 once that process has been completed. From then on it relies on the output of Component 5 250 to deduce if the user is allowed to continue or conduct certain actions that require authentication. Several parts of the application may be accessible with or without a valid authentication session. Embodiments of the invention may be used to prematurely end a session (when, for example, the authentication is no longer valid). Embodiments of the invention may be used in extending a session.

Further, some or all of the hardware and/or software underlying the application may be located on the device itself or at a different location (including the cloud). For any component or step, the device may transmit data to a different location where the data is processed. The processing at that different location may result in actions that take place in that different location, another location and/or by the device itself (after the device receives the processed data).

Further, the application may be a hardware or software service that enables the user to complete a task. A simple application may be an authentication mechanism that unlocks a door, e.g. a thumbprint reader.

Within Component 7, Components 6 260 are sensors (that may be located on a device) for converting observable phenomena into a plurality of sensor values. Each sensor represents a specific instance of Component 6 260. A sensor is a piece of hardware or software that can observe a parameter of a phenomena, either physical or digital in nature, and convert that parameter into a digital value. An example of a hardware sensor is a temperature sensor which is a resistor whose resistance changes with temperature in a predictable way. An example of a software sensor is a connector to a calendar application that can detect if a calendar event is present at the current point in time. A sensor can be queried at any time, at which point an operation is executed which converts the observable phenomena into a digital or analog value and returns that value, either to the requesting unit, or an analog-digital converter (ADC, Component 8 280). Also, sensors located on the device may also be able to sense remote phenomena, such as satellite signals (GPS) or cell tower signal strength (possibly using received signal strength indication or RSSI).

Sensors may also integrate some part of the processing themselves. For example, a garage light motion sensor outputs motion/no-motion (behavior) because it looks at the infrared spectrum (sensor) processes it and predicts an output. In this case the same process is conducted, but it happens in the sensor, and not in the application.

Component 8 280 is a converter, which may process the plurality of sensor values prior to providing the plurality of sensor values to the sensor observation engine. This component may be used to allow the use of non-digital sensors (Component 6 260). For example, hardware sensors may incorporate an optional analog-to-digital converter (ADC) that consumes the analog output of the sensor (a voltage level) and converts that into a digital representation for that value (e.g. a number and range). It may also perform further operations to convert the number into a specific set of units, such as degrees Celsius or meters per second squared or g's. For digital sensors that can be system API's, an example would be a software module that queries the calendar API at any given time and returns true if an event is present or false otherwise. This module connects to the sensors (Component 6 260) for input, and outputs to Component 3 230.

Further the converter may be a hardware or software component that converts analog or digital information coming from a sensor into digital readings consumable by a hardware or software entity. A simple example is a software calendar adapter that takes the current time and a list of events and times and returns true if there is an event at this time, false otherwise.

Component 2 210 is a sensor observation engine that collects data from device sensors. This sensor observation engine converts the plurality of sensor values into behavior raw data. This component periodically reads values from sensing units in Component 6 206. The period with which values are read may be static or dynamic. When each observation is collected, the time at which it was collected is noted and appended to the value read, creating a time-series of values of the phenomena that the specific sensing unit is capable of reading. The output of this component is a time-series for each sensor connected to the system. This component is connected to one or more sensor units (Component 6 260). This component may be connected to Components 6 260 through an analog/digital converter (Component 8 280).

Further, Component 2 220 may be constructed by using an internal timing mechanism of the computation hardware. A period of time (window) is defined over which data will be collected. For each sensor frequency is set (either statically or dynamically based on system or user behavior). When the period defined by that frequency expires, the value is read from the sensor, either directly or using an ADC. Each measurement is appended to the exact time at which it was recorded, and added to the pool of data. Once collection time window has expired, all measurements in that window, as judged by their timestamp are passed on as a single object or aggregated. The windows may be set back-to-back, but may also contain overlapping information. This component may or may not perform further data processing such as resampling, normalization, interpolation or translation into different domains, e.g. time or frequency domains.

Component 3 230 is a behavior, or ephemeral state, detection engine. This behavior detection engine processes behavior raw data into behavior presence data using logic operations This component takes input from Component 2 220 and consumes a parallel time series of sensor observations and outputs variables indicating the presence of an ephemeral personal aspect, or type of behavior. The component contains a model, which is a logical algorithm or series of operations, that consumes the input time series, and outputs one or more pieces of information that pertain to ephemeral user states or the presence of certain types or class of behavior. The output of this component is a set of variables, or a vector, containing the component's estimation of the presence of a state or class of behavior.

Further, a behavior extractor may either be coded or built using machine learning using data from sequential or non-sequential sampling windows. Extractors often work over an abstraction of the underlying sensor data, i.e., characteristics of the data, rather on the raw data directly. These abstractions are often referred to as features. An example of an expert (coded) system would be to extract the average reading of the temperature sensor and set a threshold at 20 degrees C., above which the system would decide that the user has the device in their pocket, and below which the user does not have the device in their pocket. To build a machine learning approach, a number of windows of data would be collected where the specific behavior was known to have been exhibited. For example, motion data may be collected when a user was sleeping and then when a user was awake. During a model training period a model would be built to distinguish these two states, for example using the features mean and variance of the accelerometer to learn the difference between sleeping and being awake, for example using a decision tree. The logic contained in that model would then be substitute for the coded logic described above. The output would then be passed on to the following step/component, such as Component 4.

Component 4 240 is a validity decider or a validity detection engine for processing behavior raw data into behavior validity data. This component consumes the behavioral output of Component 3 230, and uses its internal, state-full or stateless, logic to decide, based on its inputs, if the inputs describe a situation over which the authentication state is still valid or not. For example, this may be as simple as a logical expression saying that the session is still valid if the current behavior type is identical to the previous behavior type, or if the types of behavior exhibited are within a certain set of valid behaviors. The output of this unit is either a binary variable containing a decision, a probability distribution which forms a recommendation, or other form of indication.

Further, this module may either be coded into an expert system, or learned based on a history of behavioral instances and previous labels, i.e. correct system behavior. A simple example would be to code a system that would invalidate the authentication session whenever there is a change noted as input from the previous time step, i.e. the session is valid so long as the user continues doing whatever they are doing, such as driving in a car.

Component 5 250 is a component that maintains the session and validity of the session of authentication. It has an authentication engine for processing the behavior validity data to determine whether the session is authentic. This component consumes the output of the validity decider (Component 4 240) and contains the authentication state of the current authentication session. This state can be queried at any time by the implementing application. The output is a discrete one-of-many distribution that informs the application about whether or not the user is authenticated for this session. It may be as simple as a Boolean variable: True for authenticated and False otherwise. It may contain more information such as a state for "previously authenticated but no longer valid" based on the needs of the application (Component 7 270). The initial state for this component is supplied by the Application (Component 7 270) to this component or directly from the authentication mechanism (Component 210).

This component 5 250 also may contain logic that updates the state based on the input decision and its internal state, where the validity Boolean is updated using a representation of an AND logic gate, meaning the new state is valid if the previous state is valid and the decision input is positive. Alternatively, the logic could be altered to create an OR gate, meaning the session is valid if it was valid before, or if the behavior revalidates it. Alternatively, any logic paradigm based on (single or multiple) previous states and current validity may be used in conjunction with, or independent from, the foregoing logic schemes. The application can query the state of this Boolean, which represents the validity of the authentication state, and the validity decider (Component 4 240) and authentication mechanism (Component 1 210) can set the variable.

Component 1 210 is an authentication mechanism, potentially a biometric, that is used to validate the identity of the user. The collection mechanism collects confidential user information. This component may be a user interface that collects secrets known only to the user and the application provider, such as a username and password. It may also be a hardware device that collects biometric information unique to the physical body of the user, such as a thumbprint reader. It may also be a software biometric, that identifies a user based on the way they behave, such as the way they execute a specific swipe, gesture or action. It may also be a software biometric that identifies a user based on other behaviors which are not performed as part of the interaction with the application.

Further, Component 1 210 may be a software UI connected to a database containing information that is only known to the database and the user. The user is prompted to enter that information, and is authenticated if it matches. Other forms may be a hardware device that measures something of the user that is intrinsic to their existence, such as the shape of their electrical heart rate signal or their fingerprint. Also, this software/device may measure something they do explicitly, such as a specific type of gesture, or implicitly, such as the way they walk.

Embodiments of the invention may be used to prematurely end a session, as well as extending it.

Figure 3:
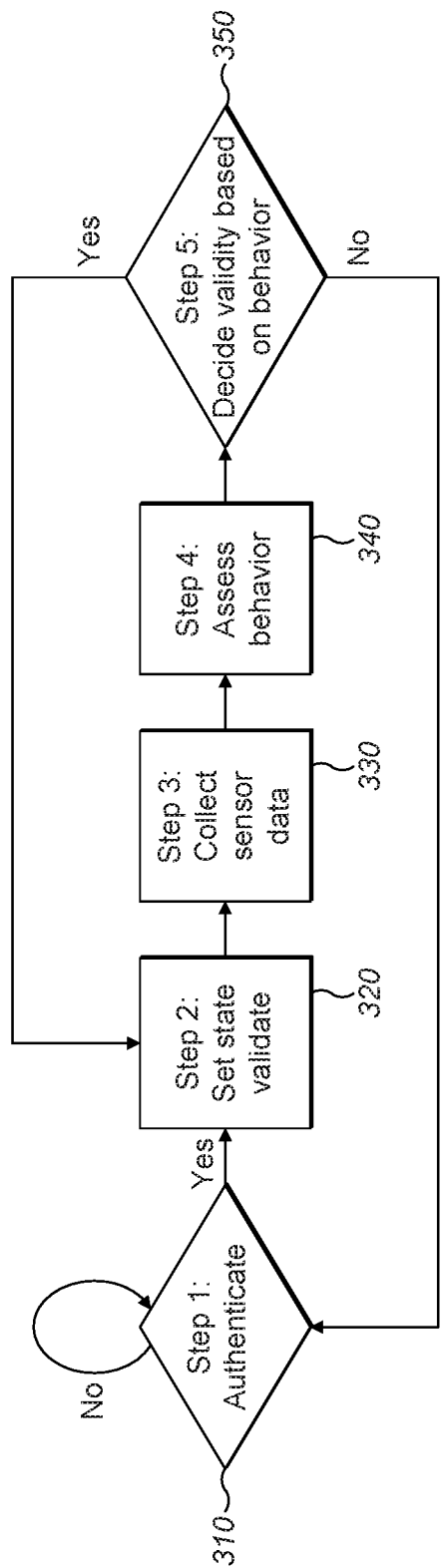
FIG. 3 shows a flowchart process of ongoing authentication based on a user's behavior.

Turning to FIG. 3, shown is a flowchart process of ongoing authentication based on a user's behavior.

Step 1 310: Component 1 210 is used at the start of the session to authenticate the identity of an authorized user.

In Step 1 130, the application requests to begin an authentication step. The authentication event itself may either be triggered by Component 5 250, or the application itself (Component 7 270). A popup requesting the user to enter a shared secret or a popup prompting the user to interact with a hardware authenticator may be used. Or the user may be requested to display behavior, such as a gesture, that will enable them to authenticate themselves. Authentication may also use some behavior that the user is performing for a different reason. Some other form of authentication may be used. If the authentication is handled by the application, the state is passed to Component 5 250.

Step 2 320: That result is fed into Component 5 250 that maintains that authentication state as valid until it is informed otherwise by Component 4 240. Here, the input is the result of the authentication event that is either provided by the application or the authentication mechanism itself. If this is a positive result, the authentication state is set to positive. If it is a negative result, the authentication state is set to negative.

Step 3 330: Continuously, Component 2 210 collects data using Component 8 280 from physical and digital sensors on the device (Components 6 260). This step is continuous in nature and is a timed period loop of waiting a specific amount of time and then querying the sensors, assigning the timestamp of the query to the result, and appending that data to the list of measurements. This may either be querying the sensors directly, or through a converter (Component 8 280). Once enough data is amassed (over a given window of time when continuous data has been collected), this step is complete and step 4 340 begins. Nonetheless, Step 3 330 may restart instantaneously and does not necessarily cause a blocking wait until the following steps are completed.

Step 4 340: Those observations are fed into Component 3 230 which outputs the behavior represented in the input coming from Component 2 220. In this step, a multidimensional timeline of observations from step 3 330 are taken as input, and a model (consisting of logic to differentiate different states or behavior) in that input is applied. The output of that logic is a state, or a distribution (either continuous or discrete) over the different states, representing the probability of their presence. Here a probabilistic system is used as an example. Other representations and logic types, such as fuzzy or possibilist systems and states, may be used instead. In any form, the input to this logic is a timeline of observations and the output is some estimate of behavior.

Step 5 350: That behavioral information is used as input for Component 4 240, which outputs a decision as to whether the session is still valid, based on observed and/or inferred behavior. In this step, a behavioral estimate is consumed as input by Component 4 240 from Component 3 230 from Step 4 340. Component 4 340 contains the logic of whether the session is validated or invalidated given the observed behavior. For example, given a session and the behavior of "walking", this module and step may decide that the session is and remains valid as long as the behavior of "walking" is present in the observational signal, and invalidated for any other behavior, meaning that the session is valid only while the user is typing into an application. This decision is output to Component 5 250 at the end of Step 5 350. If the decision is a positive one, the algorithm returns to Step 2 220 and maintains the validity. If the decision is negative, it reverts to Step 1 310 and either attempts to reauthenticate or ceases operation.

III. Alternative Configurations

The system may be built such that authentication as well is a function of behavior, and Component 1 210 is not needed.

Further, all components may not be located on the device itself or on remote data storage and computation devices accessible via network, as shown in FIG. 1.

It is also possible that the sensors used (Component 6 260) are located on a remote device also worn by, or in the vicinity of, the user, such as a wearable watch or arm band, body-embedded sensor device, remote camera, instrumented environment, or other sensing device that is affected, either directly or indirectly, by the user.

An application (Component 7 270) as well as the authentication mechanism (Component 1 210) may or may not be on the device, but may also be located remotely.

After a session is invalidated (Step 5 350), the algorithm may cease execution. If Step 1 310 fails, the algorithm may cease operation as well. A certain number of failures in Step 1 310 may preclude the algorithm from running altogether until addressed by a system administrator.

Each component may be present in multiple instances, for example multiple authentication components, multiple behavior models, and multiple decider models, each with their own rules and internal logic, either learned through machine learning or programmed as expert systems, or as a mix of both.

The authentication component (Component 1 210) may also be enabled by any of Component 2 220, Component 3 230, Component 240 4 or Component 5 250, instead of by the application.

It is possible to implement Step 3 330 and Step 4 340 in such a way as to make it completely continuous without windowing. As such, all measurements would be process at sample time to update the current detected behavior.

It is also possible to avoid feature extraction and model the underlying sensor signals as behavior or personal characteristics directly, for example using deep neural networks that learn both the features required and the model for extracting behavior.

It is also possible to utilize user behavior from Component 3 230 or from an external source directly to maintain session validity as an input directly into the application Component 7 270.

It is also possible to avoid the use of Component 3 230 and use sensor signals as indicators of behavior. For example, this can be done by using a motion detector as an indicator that automatically validates and extends the authentication session.

Embodiments of the invention may also be used to prematurely end a session, as opposed to extending it. For example, should a validity period of one hour be arbitrarily assigned to an authentication session, but the behavior should indicate otherwise, that session can be closed prematurely by Component 4. Embodiments of this invention may also be used as a tool for notifying an administrator of state changes, or lack thereof, for an authentication session, as well as extending or prematurely closing that session.

Further, should authentication be a computationally intensive or resource consuming in any way, this invention may have the added benefit of reducing the resource footprint incurred by the application by reducing the number of times those resources are consumed through authentication.

IV. Conclusion

While the foregoing descriptions disclose specific values of voltage, capacitance and current, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An apparatus comprising:
   an application for enabling a user to accomplish a task on an electronic device;
   at least one hardware sensor for converting observable phenomena regarding the user for a session into a plurality of sensor values;
   a sensor observation engine for converting the plurality of sensor values into behavior raw data;
   a validity detection engine for processing behavior raw data into behavior validity data; and
   an authentication engine for processing the behavior validity data to determine whether the session is authentic;
   an authentication session that may have a preset expiration time;
   wherein the authentication session may be extended and may be terminated based on the behavior validity data; and
   wherein the authentication engine provides a Boolean value to the application.

2. The apparatus as in claim 1, further comprising a converter for processing the plurality of sensor values prior to providing the plurality of sensor values to the sensor observation engine.

3. The apparatus as in claim 2, wherein the converter comprises an analog-to-digital converter.

4. The apparatus as in claim 1, wherein the sensor observation engine uses logic operations and a model training period.

5. The apparatus as in claim 1, wherein the sensor observation engine uses non-sequential sampling windows.

6. The apparatus as in claim 1, wherein the sensor observation engine uses sequential sampling windows.

7. The apparatus as in claim 1, wherein the validity detection engine uses behavior raw data to determine if a current behavior type is identical to a previous behavior type.

8. The apparatus as in claim 1, wherein the validity detection engine uses behavior raw data to determine if a current behavior type is within a set of valid behaviors.

9. The apparatus as in claim 1, wherein the authentication session does not have a preset expiration time and wherein the authentication session is terminated based on the behavior validity data.

10. The apparatus as in claim 1, wherein the collection mechanism is a hardware device that collects biometric information from the user.

11. The apparatus as in claim 1, wherein the authentication session has a preset time for the authentication session to be valid.

12. The apparatus as in claim 11, wherein the authentication engine terminates the authentication session prior to the preset time when processing the behavior validity data after the beginning of the authentication session.

13. The apparatus as in claim 1, wherein the authentication engine is located remotely from the electronic device.

14. The apparatus as in claim 1, wherein the at least one sensor is being worn by the user.

15. The apparatus as in claim 1, wherein the validity detection engine further comprises an extractor for analyzing an abstraction of the behavior raw data.

16. The apparatus as in claim 15, wherein the extractor is built using machine learning.

17. The apparatus as in claim 1, wherein the authentication session has a preset expiration time and wherein the authentication session is terminated before the preset expiration time based on the behavior validity data.

18. The apparatus as in claim 1, wherein the authentication session does not have a preset expiration time and wherein the authentication session is extended based on the behavior validity data.

19. The apparatus as in claim 1, wherein the authentication session has a preset expiration time and wherein the authentication session is extended before the preset expiration time based on the behavior validity data.

20. A method comprising:
- activating an application that enables a user to accomplish a task on an electronic device;
- collecting confidential user information from the user;
- converting observable phenomena regarding the user using at least one hardware sensor for a session into a plurality of sensor values;
- converting the plurality of sensor values into behavior raw data using a sensor observation engine;
- processing behavior raw data into behavior validity data using a validity detection engine; and
- processing the behavior validity data by an authentication engine to determine whether the session is authentic;
- wherein the session may have a preset expiration time;
- wherein the session may be extended and may be terminated based on the behavior validity data; and
- wherein the authentication engine provides a Boolean value to the application.

21. The method as in claim 20, further comprising processing the plurality of sensor values by a converter prior to providing the plurality of sensor values to the sensor observation engine.

* * * * *